(12) United States Patent
Bax

(10) Patent No.: US 6,583,975 B2
(45) Date of Patent: Jun. 24, 2003

(54) AIRCRAFT APPLICABLE GROUND FAULT CIRCUIT INTERRUPTER

(75) Inventor: Ronald A. Bax, Burbank, CA (US)

(73) Assignee: Hydro-Aire, Inc., Burbank, CA (US)

( * ) Notice: Subject to any disclaimer, the term of this patent is extended or adjusted under 35 U.S.C. 154(b) by 104 days.

(21) Appl. No.: 09/775,337

(22) Filed: Feb. 1, 2001

(65) Prior Publication Data

US 2002/0101698 A1 Aug. 1, 2002

(51) Int. Cl.$^7$ ................................................. H02H 3/00
(52) U.S. Cl. ......................... 361/93.1; 361/42; 361/44; 361/115
(58) Field of Search ........................... 361/42, 44, 115, 361/93.1, 58, 78, 38, 18

(56) References Cited

U.S. PATENT DOCUMENTS

| | | | |
|---|---|---|---|
| 3,512,045 A | 5/1970 | Tipton et al. ................. 317/18 |
| 3,611,038 A | 10/1971 | Benham ....................... 317/18 |
| 3,800,121 A | 3/1974 | Dean et al. ................. 219/202 |
| 4,034,267 A | 7/1977 | Wilson ........................ 361/44 |
| 4,093,977 A | 6/1978 | Wilson ........................ 361/44 |
| 4,115,829 A | 9/1978 | Howell ........................ 361/42 |
| 4,173,774 A | 11/1979 | Hyvarinen et al. ........... 361/87 |
| 4,205,358 A | 5/1980 | Washington .................. 361/44 |
| 4,271,444 A | 6/1981 | Howell ........................ 361/48 |
| 4,347,540 A | 8/1982 | Gary et al. .................... 361/47 |
| 4,685,022 A | 8/1987 | Nichols, III et al. .......... 361/44 |
| 4,688,134 A | 8/1987 | Freeman et al. .............. 361/45 |
| 4,783,713 A | 11/1988 | Chen .......................... 361/48 |
| 5,019,956 A | * 5/1991 | Nakayama et al. ......... 340/664 |
| 5,047,890 A | 9/1991 | Kessler ........................ 361/93 |
| 5,241,443 A | 8/1993 | Efantis ......................... 361/36 |
| 5,309,311 A | 5/1994 | Ballada ........................ 361/48 |
| 5,334,912 A | * 8/1994 | Counts ....................... 315/119 |
| 5,361,183 A | 11/1994 | Wiese ......................... 361/42 |
| 5,521,787 A | 5/1996 | Baker et al. | |
| 5,552,952 A | 9/1996 | Kramer et al. ................ 361/86 |
| 5,745,322 A | 4/1998 | Duffy et al. .................. 361/45 |
| 5,835,322 A | 11/1998 | Smith et al. ................... 361/45 |
| 5,966,280 A | 10/1999 | Cerminara et al. ........... 361/47 |
| 5,969,921 A | 10/1999 | Wafer et al. ................... 361/45 |
| 6,002,563 A | 12/1999 | Esakoff et al. ................ 361/87 |
| 6,091,591 A | 7/2000 | Heinz et al. .................. 361/45 |
| 6,246,332 B1 | 6/2001 | Hubbard ...................... 340/658 |

(List continued on next page.)

FOREIGN PATENT DOCUMENTS

| | | | | |
|---|---|---|---|---|
| DE | 3504034 A1 | 8/1986 | ........ H01H/47/04 |
| EP | 0 905 849 A1 | 3/1999 | ........ H02H/3/347 |
| GB | 2318002 A | 4/1998 | ........... H02H/3/33 |

OTHER PUBLICATIONS

International Search Report Dated Sep. 26, 2002.
Brochure—Eaton Aerospace—"Arc Fault Circuit Interrupter" Jan. 2001, 4 pages.
Leach International, *"Smart" Contractors, Application Notes, No. 104, Jun., 2000.*

Primary Examiner—Stephen W. Jackson
(74) Attorney, Agent, or Firm—Fulwider Patton Lee & Utecht, LLP

(57) ABSTRACT

The aircraft applicable ground fault circuit interrupter interrupts a circuit when a current imbalance is sensed. The circuit interrupter includes a power supply, a sensor for sensing a current imbalance at the line side of the circuit, a logic controller, and a power controller. The power supply provides power to the sensor, logic controller, and the power controller. The logic controller receives input from the sensor, and the power controller receives input from the logic controller, and interrupts power to the load side of the circuit when the sensor senses a current imbalance. Power interruption due to a sensed current imbalance is maintained until the power source is cycled. The circuit interrupter is preferably autonomous, requiring no additional signals, inputs, or sources of power.

13 Claims, 14 Drawing Sheets

U.S. PATENT DOCUMENTS

| | | | |
|---|---|---|---|
| 6,246,556 B1 | 6/2001 | Haun et al. | 361/42 |
| 6,249,230 B1 | 6/2001 | Baldwin et al. | 340/650 |
| 6,266,219 B1 | 7/2001 | Macbeth et al. | 361/42 |
| 6,278,381 B1 | 8/2001 | Bogert | 340/945 |
| 6,278,596 B1 | 8/2001 | Simpson | 361/42 |
| 6,320,731 B1 | 11/2001 | Eaves et al. | 361/42 |
| 6,327,124 B1 | 12/2001 | Fearing et al. | 361/31 |
| 2001/0022713 A1 | 9/2001 | Gimenez et al. | 361/42 |
| 2001/0036048 A1 | 11/2001 | Goto et al. | 361/42 |
| 2001/0036049 A1 | 11/2001 | DiSalvo et al. | 361/42 |

* cited by examiner

AIRCRAFT APPLICABLE GROUND FAULT CIRCUIT INTERRUPTER

BACKGROUND OF THE INVENTION

This invention relates generally to electrical control systems, and more specifically to an aircraft electrical control system which disconnects power to a load when a current imbalance is sensed.

In the electromechanical arts, current imbalances are serious problems that can lead to disastrous results, such as arcing within fuel pumps. Arcing within a fuel pump can lead to a breach of the fuel vessel. In aircraft, such a breach can be catastrophic. Thus, a device or methodology is needed that can suppress this type of arcing, as well as other associated problems. Presently, a common type of current protection device being utilized in aircraft is a thermal circuit breaker. However, arcing typically does not cause thermal circuit breakers to activate. There thus exists a need for an improved ground fault circuit interrupter device, particularly for aircraft. The present invention addresses these and other concerns.

SUMMARY OF THE INVENTION

The present invention is directed towards a ground fault circuit interrupter particularly attractive for use in aircraft for interrupting a circuit having a line side and a load side. The ground fault circuit interrupter can be retrofit to existing aircraft, or can be utilized in newly constructed aircraft and new aircraft designs. The aircraft applicable ground fault circuit interrupter includes a power supply, a circuit to be monitored, a sensor, a logic controller, and a power controller. The power supply is configured to provide power to the sensor and logic controller. A second power supply may optionally be provided to power the power controller. The sensor is configured to sense a current imbalance in the line side of the circuit to be monitored. The logic controller is configured to process input from the sensor. In a presently preferred embodiment, the logic controller compares the sensor signal with a range of sensor signals representing acceptable operation and outputs a signal representing a circuit current imbalance when the sensor signal is outside the acceptable range of signals. The power controller is configured to receive input from the logic controller and remove power to the load side of the circuit when a current imbalance is sensed. In a presently preferred embodiment, the power removal from the load side of the circuit due to a sensed current imbalance is maintained until the power source is cycled.

The present invention also provides for a method for interrupting an electrical circuit for an electrical load, the electrical circuit having a line side and a load side with a ground fault. Briefly, the method comprises providing a supply of power, continually monitoring the circuit for a current imbalance, sensing a current imbalance in the line side of the circuit, processing input from a power supply and a sensor, receiving input from a logic controller, and interrupting the circuit when a current imbalance is sensed. In one presently preferred aspect, interrupting of the circuit when a current imbalance is sensed is maintained until the power source is cycled. Typically, the load being supplied by the current is a motor. In another preferred aspect, no additional signals, inputs, or sources of power are required. In one presently preferred use of the method, the load side of the circuit is connected to a fuel pump, and arcing is suppressed within the fuel pump.

Other features and advantages of the present invention will become apparent from the following detailed description taken in conjunction with the accompanying drawings which illustrate, by way of example, the principles of the invention.

DETAILED DESCRIPTION OF THE PREFERRED EMBODIMENTS

Figure 1:
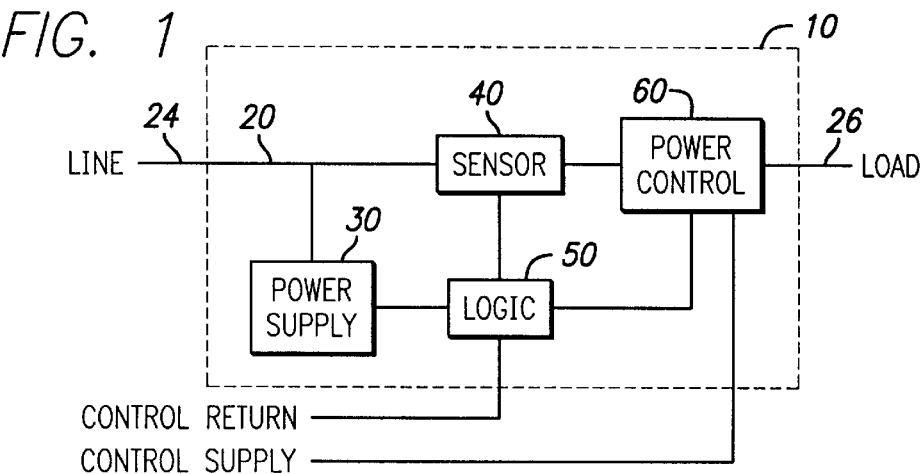
FIG. 1 illustrates a block diagram of a first embodiment of a control system of the present invention adapted for a Boeing 757 aircraft, for interrupting the circuit when a current imbalance is sensed.
Figure 5:
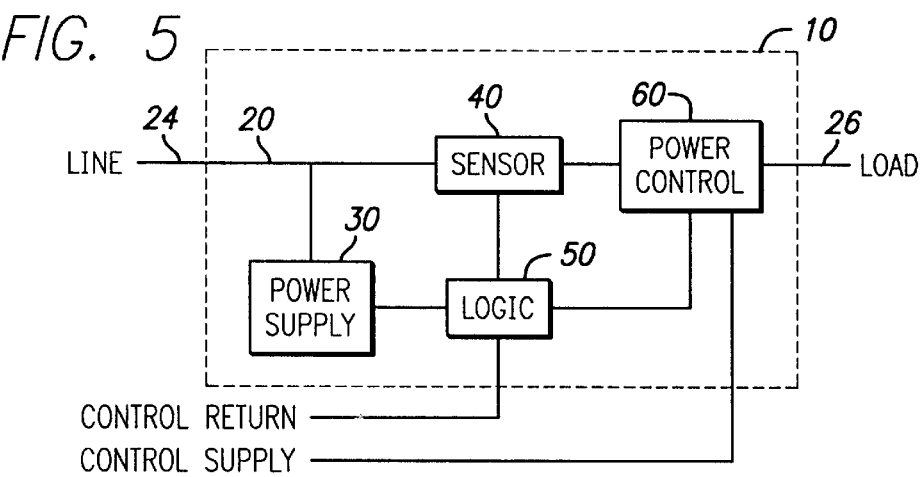
FIG. 5 illustrates a block diagram of a second embodiment of a control system of the present invention adapted for a Boeing 747 aircraft, for interrupting the circuit when a current imbalance is sensed.

FIG. 1 illustrates a preferred embodiment of a control system 10, adapted for a Boeing 757 aircraft, and FIG. 5 illustrates a preferred embodiment of a control system 10, adapted for a Boeing 747 aircraft, each being constructed in accordance with the present invention for disconnecting power to a load when a current imbalance is sensed. Referring to FIGS. 1 and 5, the aircraft applicable ground fault circuit interrupter 10 of the invention interrupts a circuit 20 having a line side 24 and a load side 26 with a ground fault. The load may be a motor, or any electrical device drawing a load, where protection of equipment or personnel is desired. The ground fault circuit interrupter of the invention includes a power supply 30, a sensor 40, a logic controller 50, and a power controller 60. The power supply is configured to provide power to the logic controller, and the sensor is configured to sense a current imbalance in the line side 24 of the circuit 20, and to output a sensor signal to the logic controller. The logic controller is configured to receive and process the sensor signal input from the sensor, and the power controller is configured to receive input from the logic controller and remove power to the load side of the circuit when a current imbalance is sensed.

Figure 2:
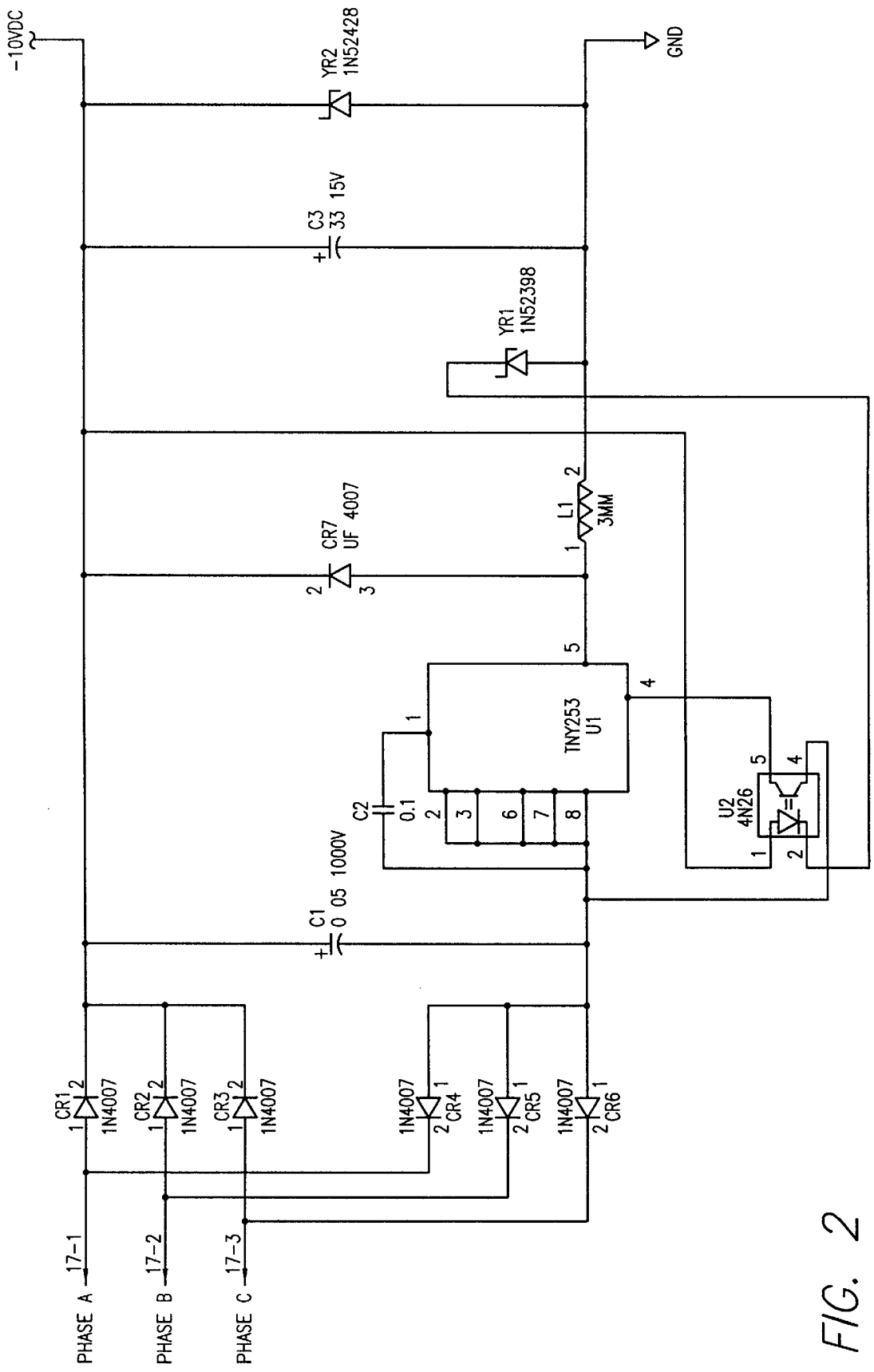
FIG. 2 illustrates a detailed view of the power supply portion of the control system shown in FIG. 1.
Figures 1, 3:
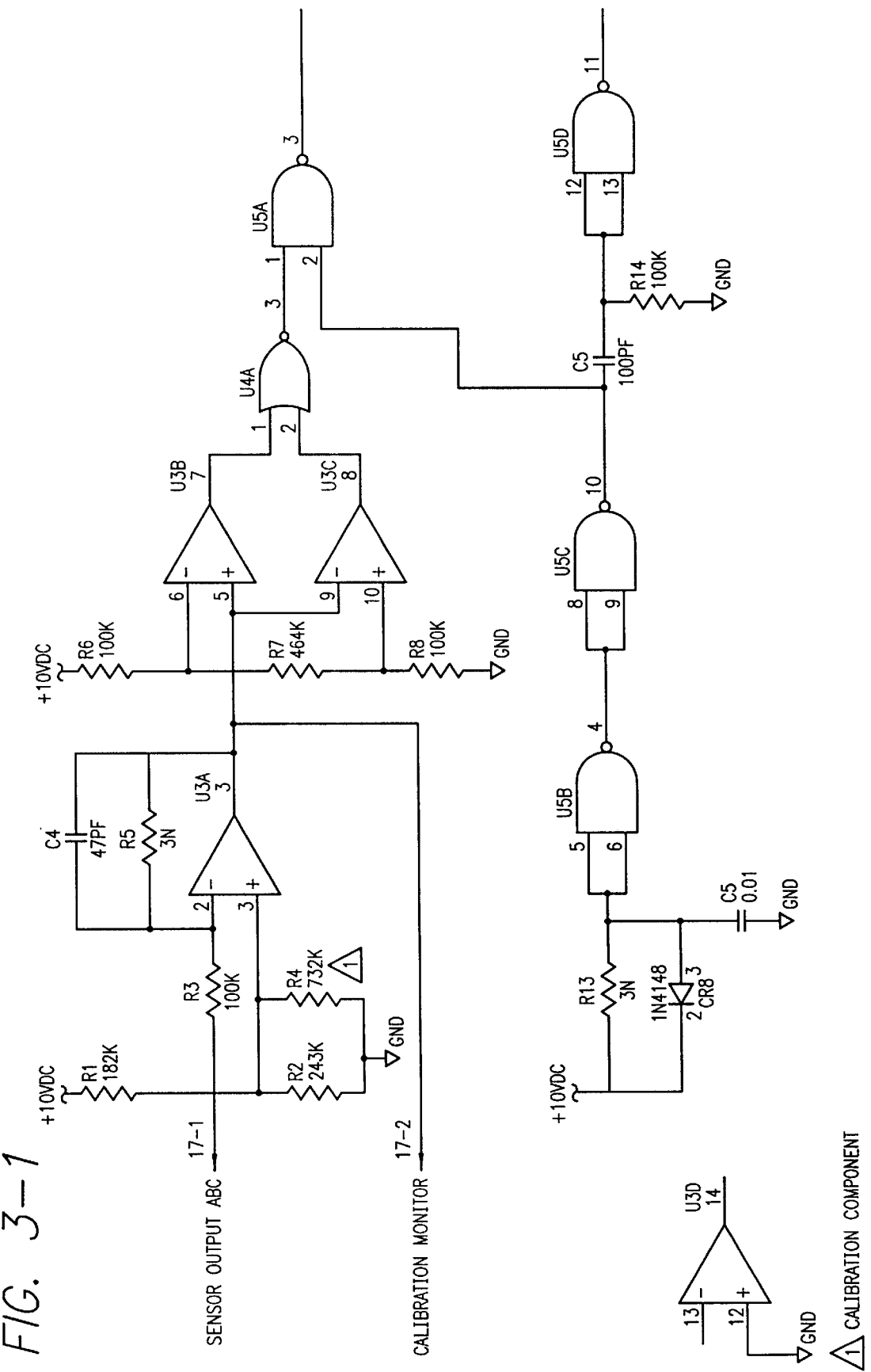
FIG. 3 illustrates a detailed view of the logic controller portion of the control system shown in FIG. 1.
Figures 2, 3:
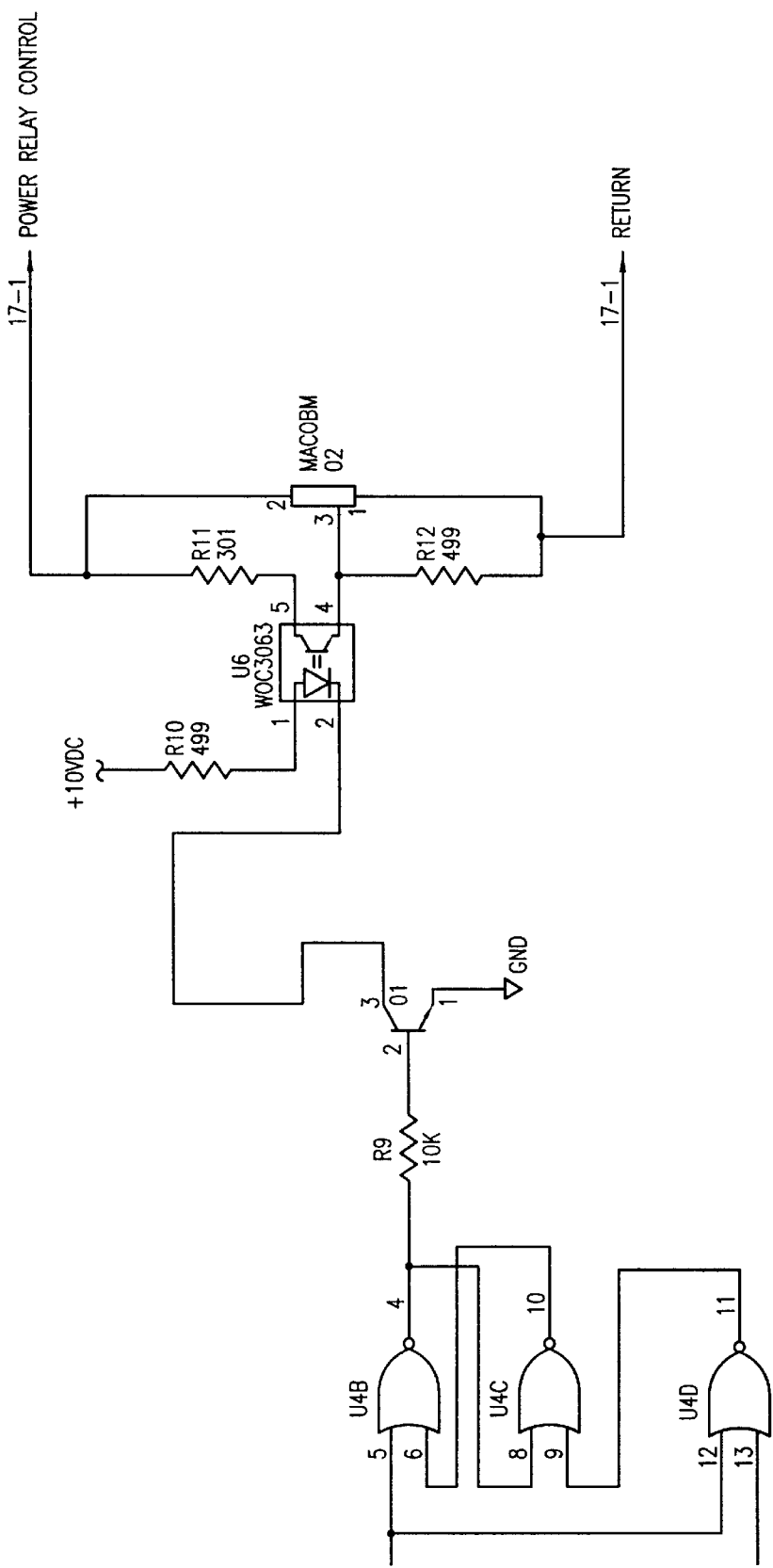
Figure 4:
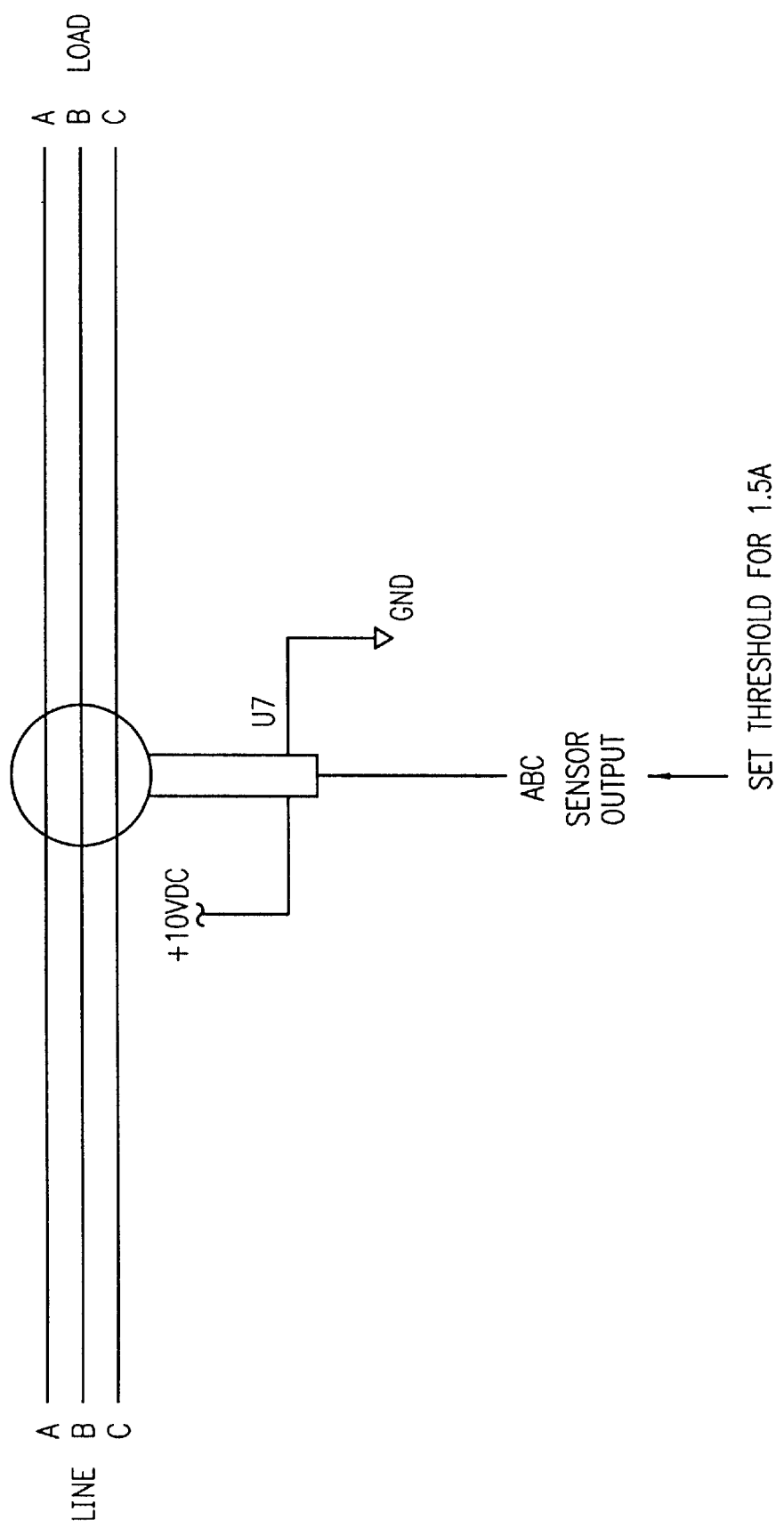
FIG. 4 illustrates a detailed view of a sensor for the control system of FIG. 1.
Figure 6:
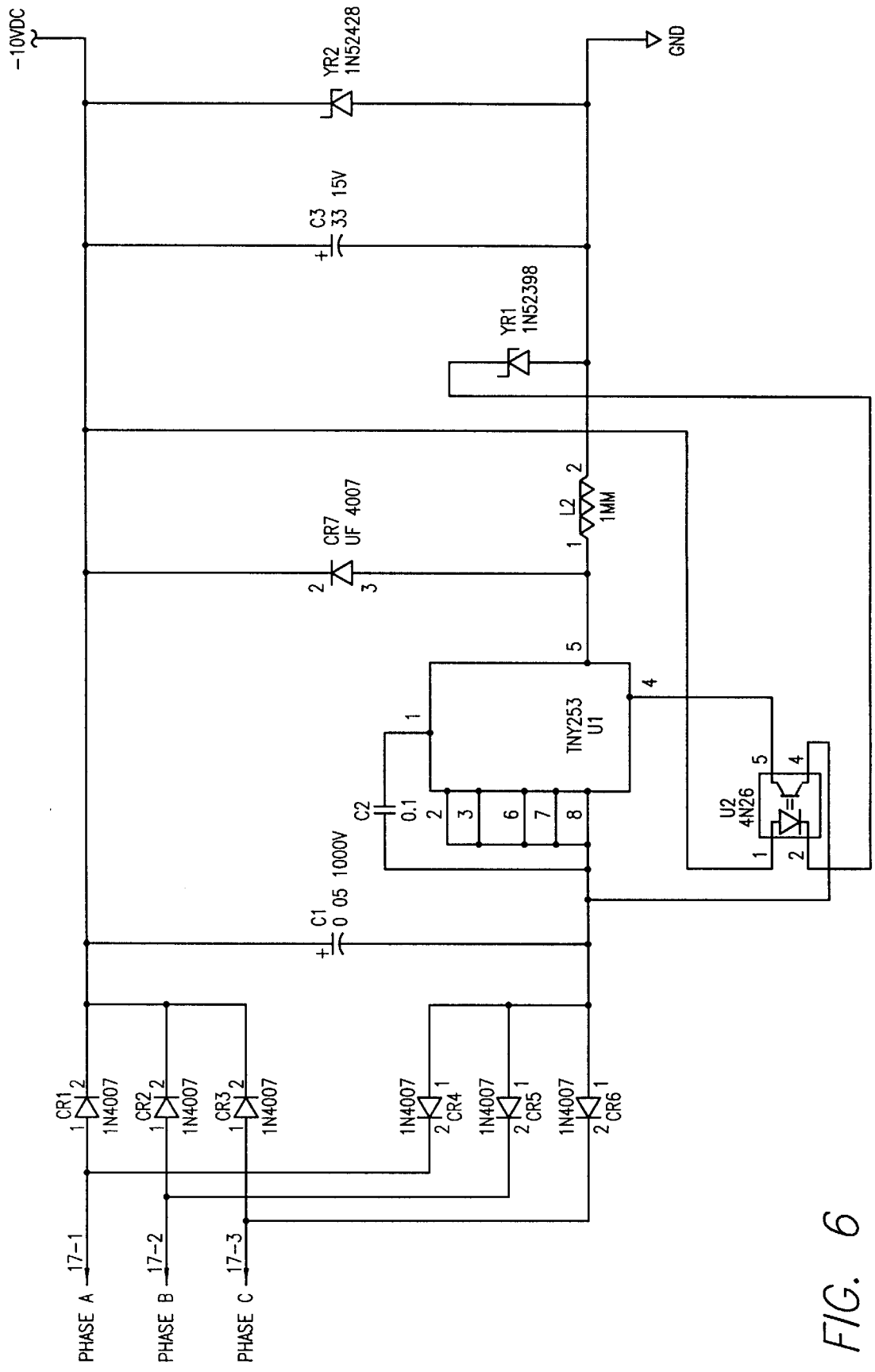
FIG. 6 illustrates a detailed view of the power supply portion of the control system shown in FIG. 5.
Figures 1, 7:
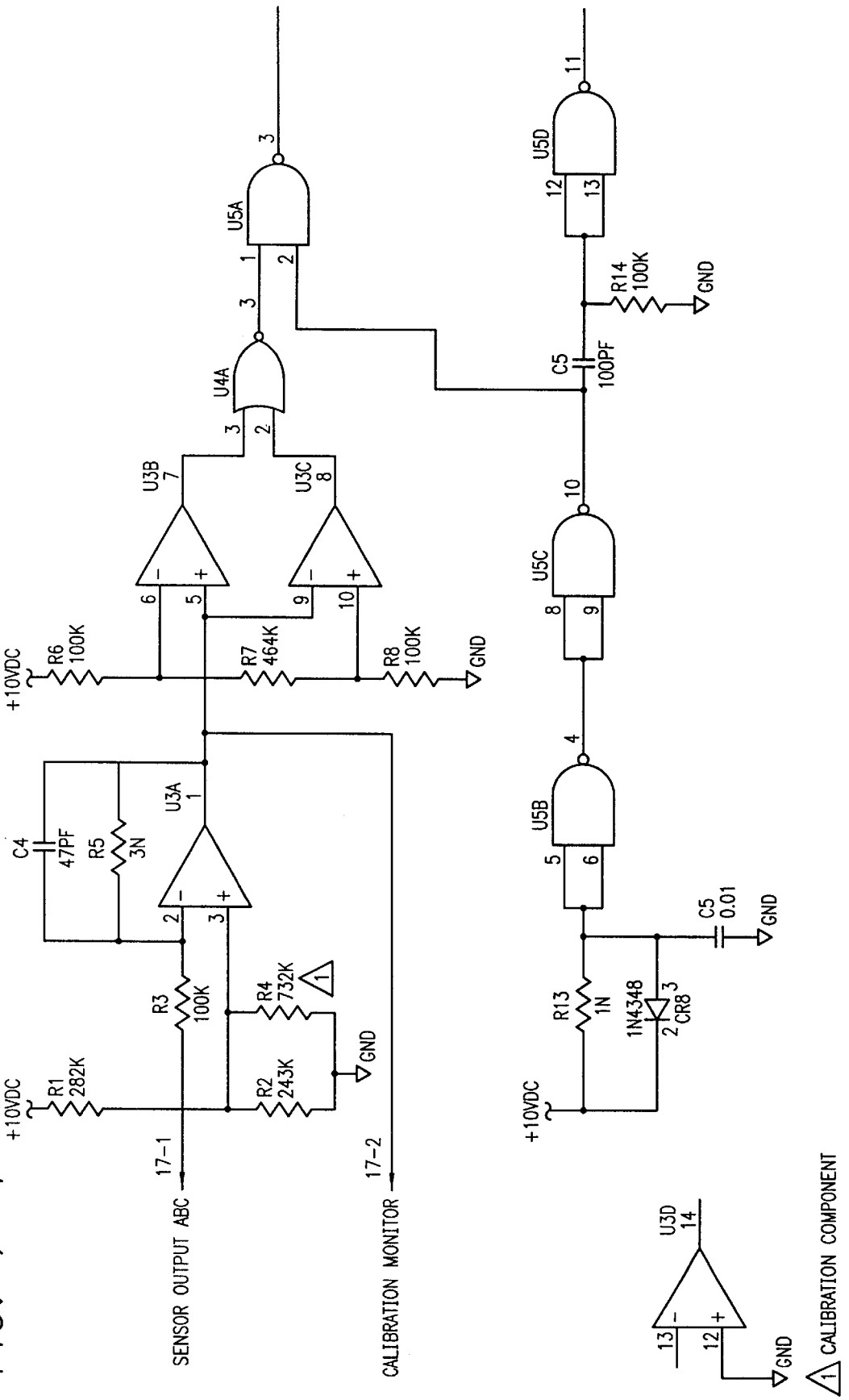
FIG. 7 illustrates a detailed view of the logic controller portion of the control system shown in FIG. 5.
Figures 2, 7:
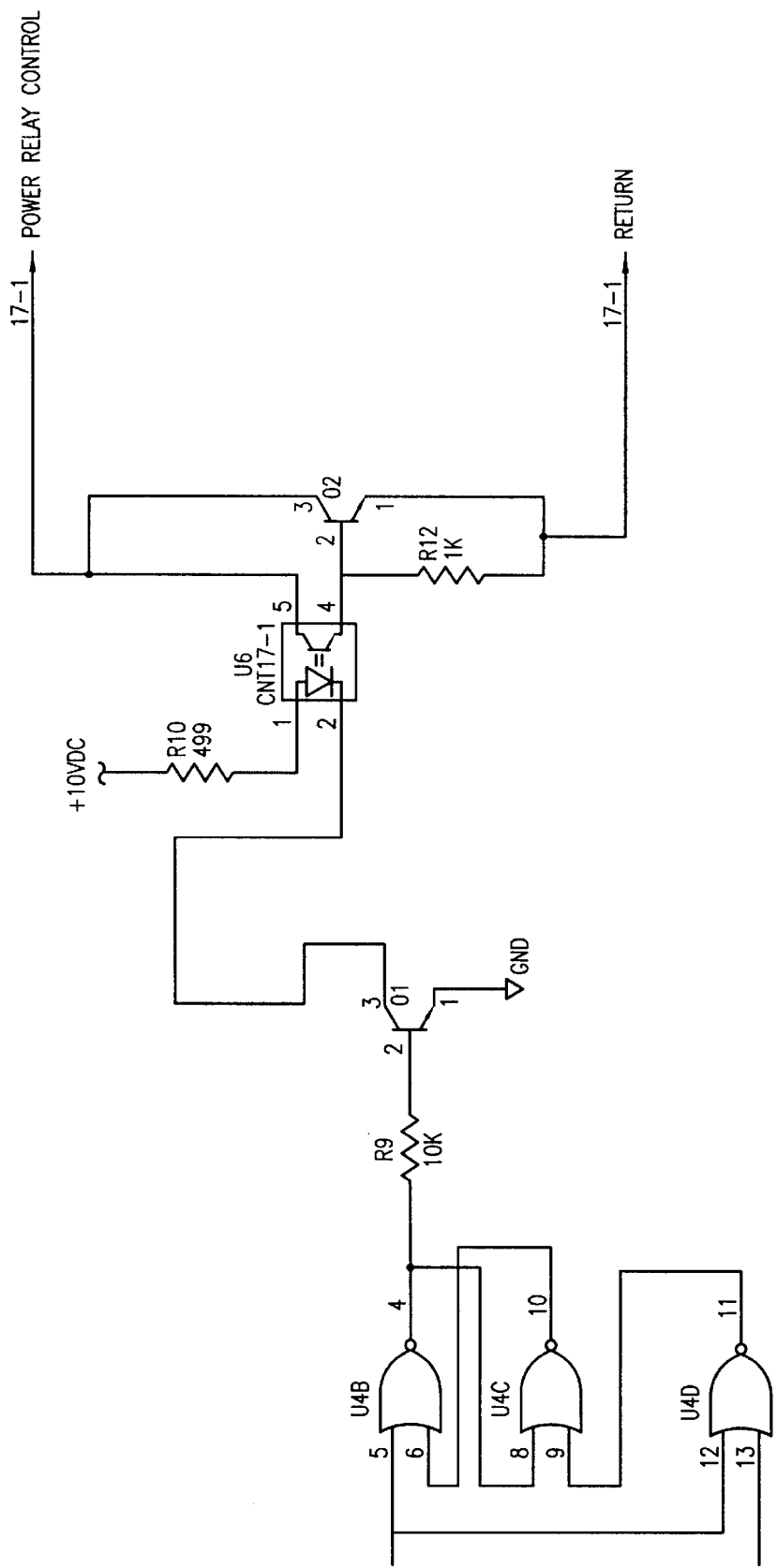
Figure 8:
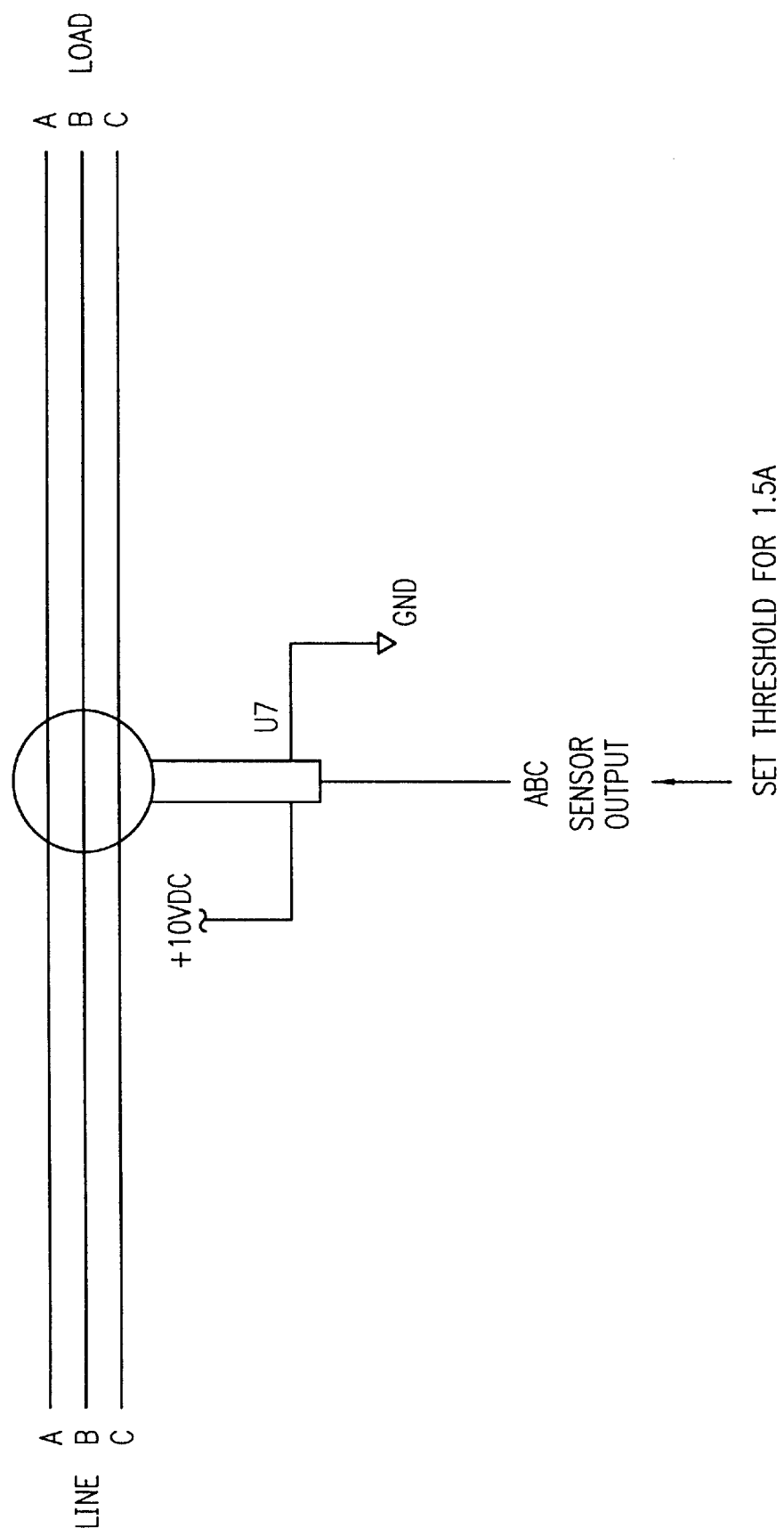
FIG. 8 illustrates a detailed view of a sensor for the control system of FIG. 5.

FIGS. 2 and 6 illustrate a detailed view of a preferred embodiment of the power supply, and FIGS. 3 and 7 illustrate a detailed view of a preferred embodiment of the logic controller. Referring to FIGS. 4 and 8, showing a sensor for use in the control system of the invention, in a preferred embodiment of the present invention, the sensor preferably includes the IC U7, which is an Amploc Pro 5 Hall effect linear sensor with an output of 233 mV/A when operated at 10V. All three pump power-phase wires pass through the sensor core. Kirchhcoff's current law states that the net current in a node is 0. Considering the wye connection point of the pump winding and looking back to the inputs of the phase windings, the net current in the phase windings, when algebraically summed, is 0. If a ground fault exists, that is where the current is supplied through the sensor but does not return through the sensor, the algebraic sum of the currents in the phase wires would be equal to the ground fault current. For example, a fourth wire could be added to the wye connection point, and returned to the power source, but not pass through the sensor. The net current in all four wires would still be 0, but the imbalance current that passed through the sensor, by way of the three phase wires, would be equal to the current in the fourth wire.

In a preferred embodiment, the output of the sensor is approximately one-half of the supply voltage, for no measured imbalance. Amplifier U3A amplifies the signal by a factor of 10. The gain is set by the ratio of resistors R5 and R3. The 3 db point is where the reactance of capacitor C4 is equal to the resistance of R5. This occurs at 3386 Hz. Resistors R1, R2, and R4 bias the amplifier and have been selected so that a maximum value of 1 meg, for resistor R4, is required to adjust the amplifier output to mid supply with the sensor at its specified worse case high output. Calibration for the worse case low output of the sensor is easily achieved.

Amplifiers U3B and U3C, and resistors R6, R7, and R8 are set to detect a current imbalance greater than about 1.5A. A high output from amplifier U3B or U3C indicates an imbalance is present in excess of the 1.5A threshold. IC U4A "OR's" the outputs from amplifiers U3B and U3C. A logic 0 at its output indicates one or the other failure condition is present. Simultaneous imbalance inputs can be handled but are physically not possible since a positive imbalance cannot exist at the same time as a negative imbalance.

If a fault condition exists, it passes through IC U5A presenting a logic 1 to the latch comprised of ICs U4B and U4C. A logic 1, at pin 5, forces the output pin 4 low, turning transistor Q1 off, which removes the drive signal to the power control stage. Pin 9, the other input to the latch, is normally at logic 0. This will cause pin 10 to go high, setting the latch by presenting a logic 1 to pin 6.

In a preferred embodiment, the powerup sequence initializes the power control section to the non-operate mode. This is accomplished by presenting a logic 0 to pin 2 of IC USA to mimic a current imbalance condition.

The powerup reset pulse created by IC U5B, resistor R13, capacitor C5 and diode CR8 is typically 7 msec. The reset is determined by the time it takes to charge capacitor C5 through resistor R13 to the threshold set by IC U5B. Diode CR8 provides a quick reset.

Diodes CR1, CR2, CR3, CR4, CR5, and CR6 form a full-wave three-phase bridge. Capacitor C1 acts as the storage device for the 281V peak voltage produced by the bridge. The regulator is a preferably buck-type configuration with the abnormal architecture of having the inductor in the lower side. This is acceptable because the circuit does not have to be referenced to earth ground. In fact, the on-board electrical ground is approximately 270 V above earth ground.

Preferably, the switcher operates in an non-conventional mode. If it senses that output voltage is low, it turns on and remains on until the current through inductor L1 reaches a pre-determined amount. Otherwise, the cycle is skipped. Energy is stored in inductor L1 and transferred to output capacitor C3 through diode CR7. Proper regulation is determined by Zener VR1 and opto-coupler U2. Capacitor C2 serves to store a small amount of energy that the regulator uses to operate its internal circuitry.

Figure 9:
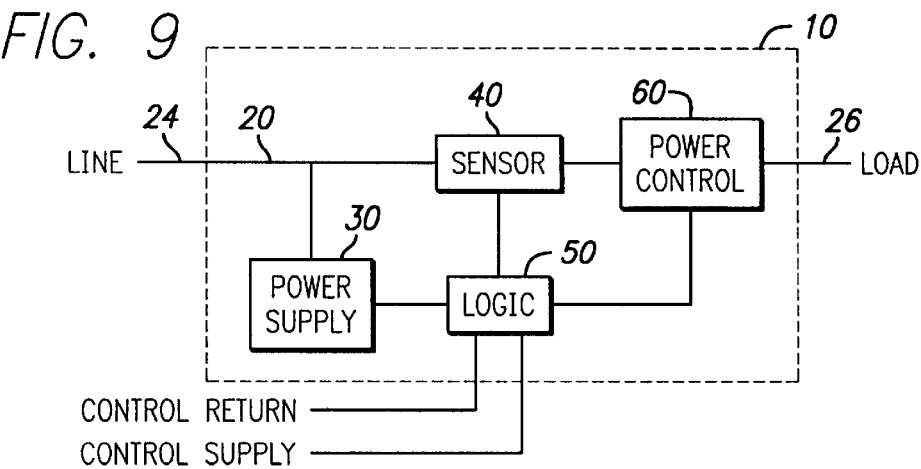
FIG. 9 illustrates a block diagram of an alternate preferred embodiment of a control system of the present invention adapted for providing the speed of a DC relay in an AC application for interrupting the circuit when a current imbalance is sensed.

Referring to FIGS. 9–13, illustrating an alternate preferred embodiment of a control system of the present invention adapted for an AC-DC application, to interrupt the circuit when a current imbalance is sensed. As is shown in FIG. 9, the aircraft applicable ground fault circuit interrupter 10 of the invention interrupts a circuit 20 having a line side 24 and a load side 26 with a ground fault. The load may be a motor, or any electrical device drawing a load, where protection of equipment or personnel is desired. The ground fault circuit interrupter of the invention includes a power supply 30, a sensor 40, a logic controller 50, and a power controller 60. The power supply is configured to provide power to the logic controller, and the sensor is configured to sense a current imbalance in the line side 24 of the circuit 20, and to output a sensor signal to the logic controller. The logic controller is configured to receive and process the sensor signal input from the sensor, and the power controller is configured to receive input from the logic controller and remove power to the load side of the circuit when a current imbalance is sensed.

Figure 10:
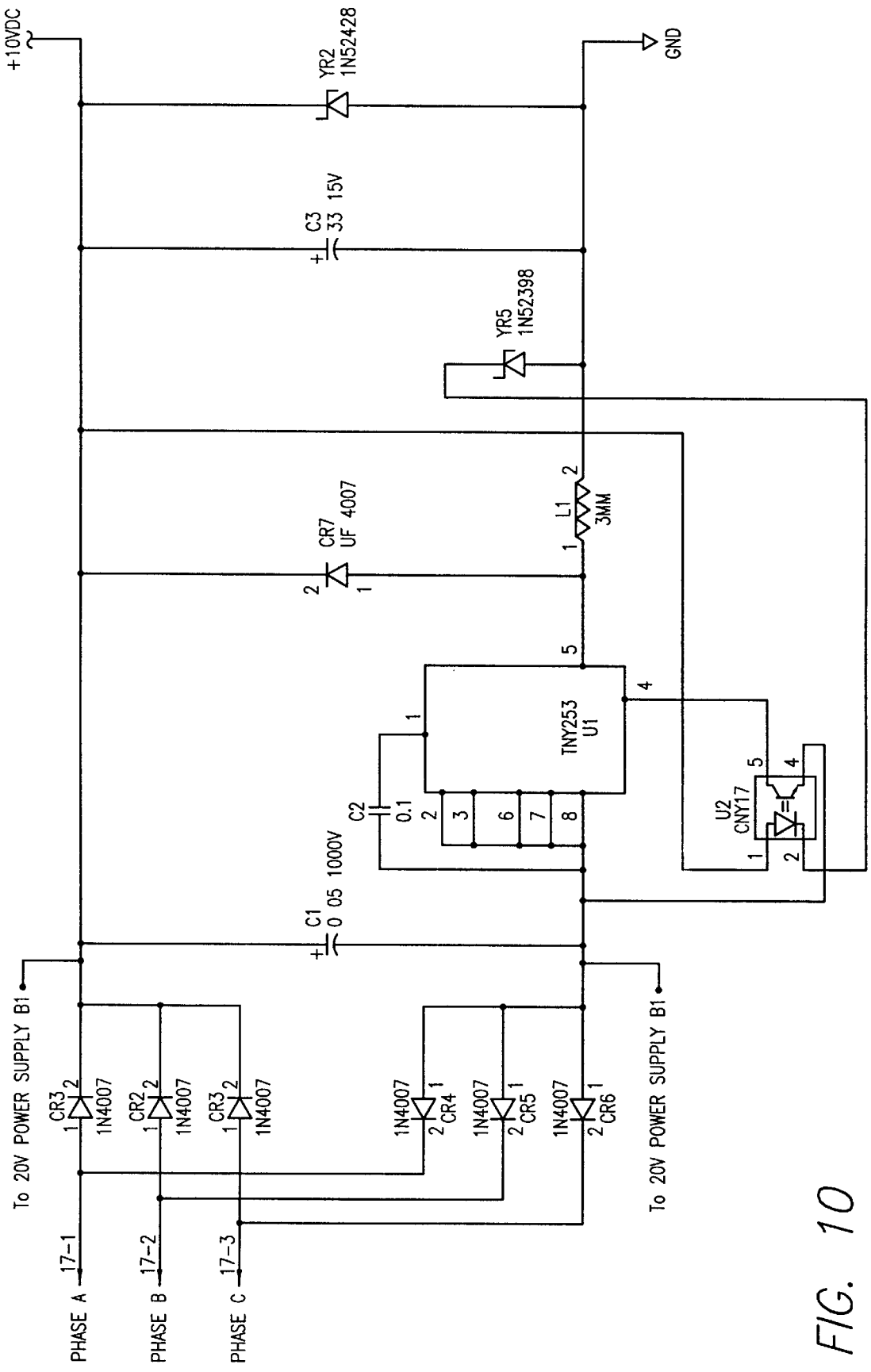
FIG. 10 illustrates a detailed view of a preferred embodiment of one section of the power supply portion of the control system shown in FIG. 9.
Figure 11:
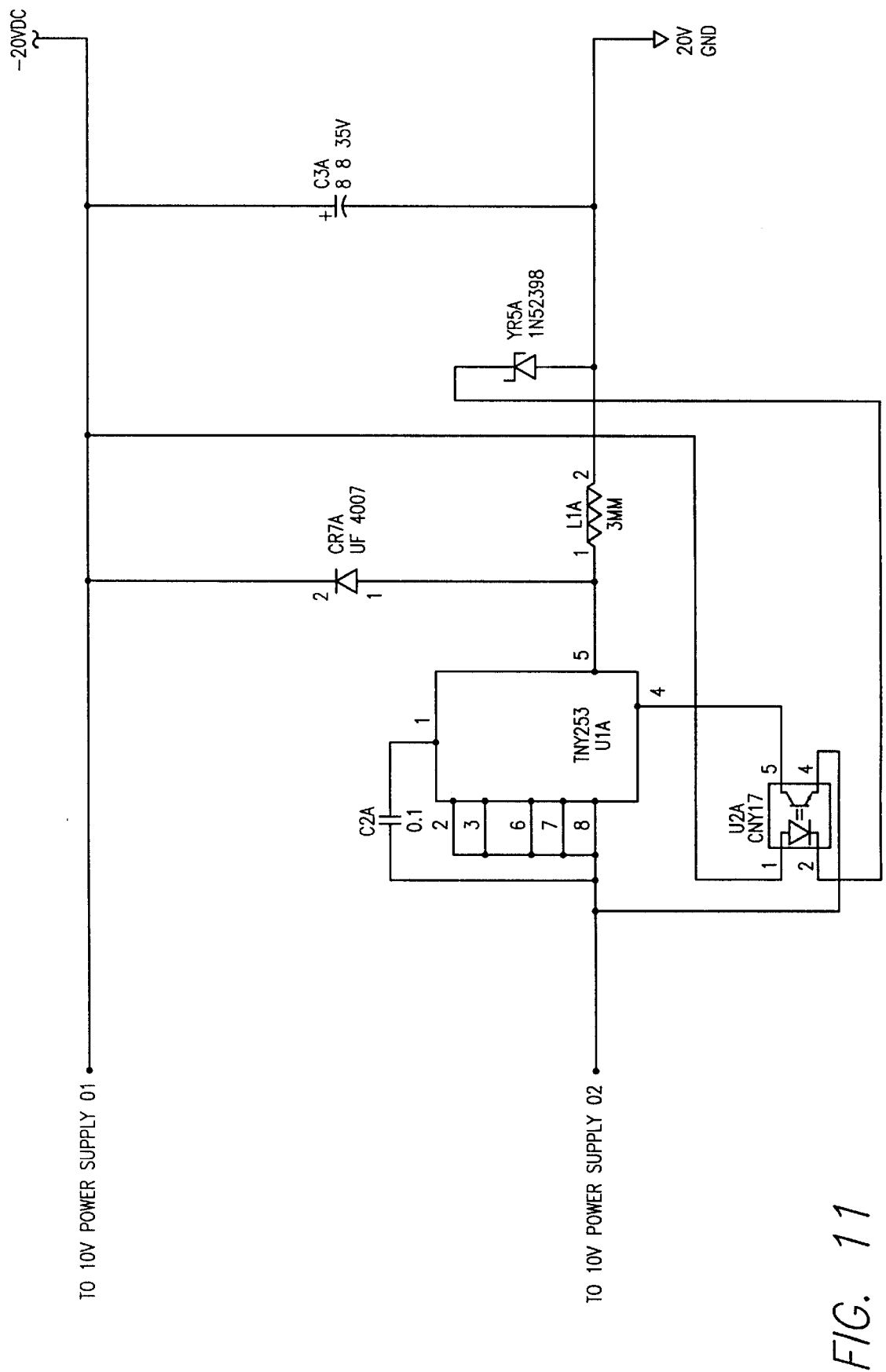
FIG. 11 illustrates a detailed view of a second section of the power supply portion of the control system shown in FIG. 9.
Figures 1, 12:
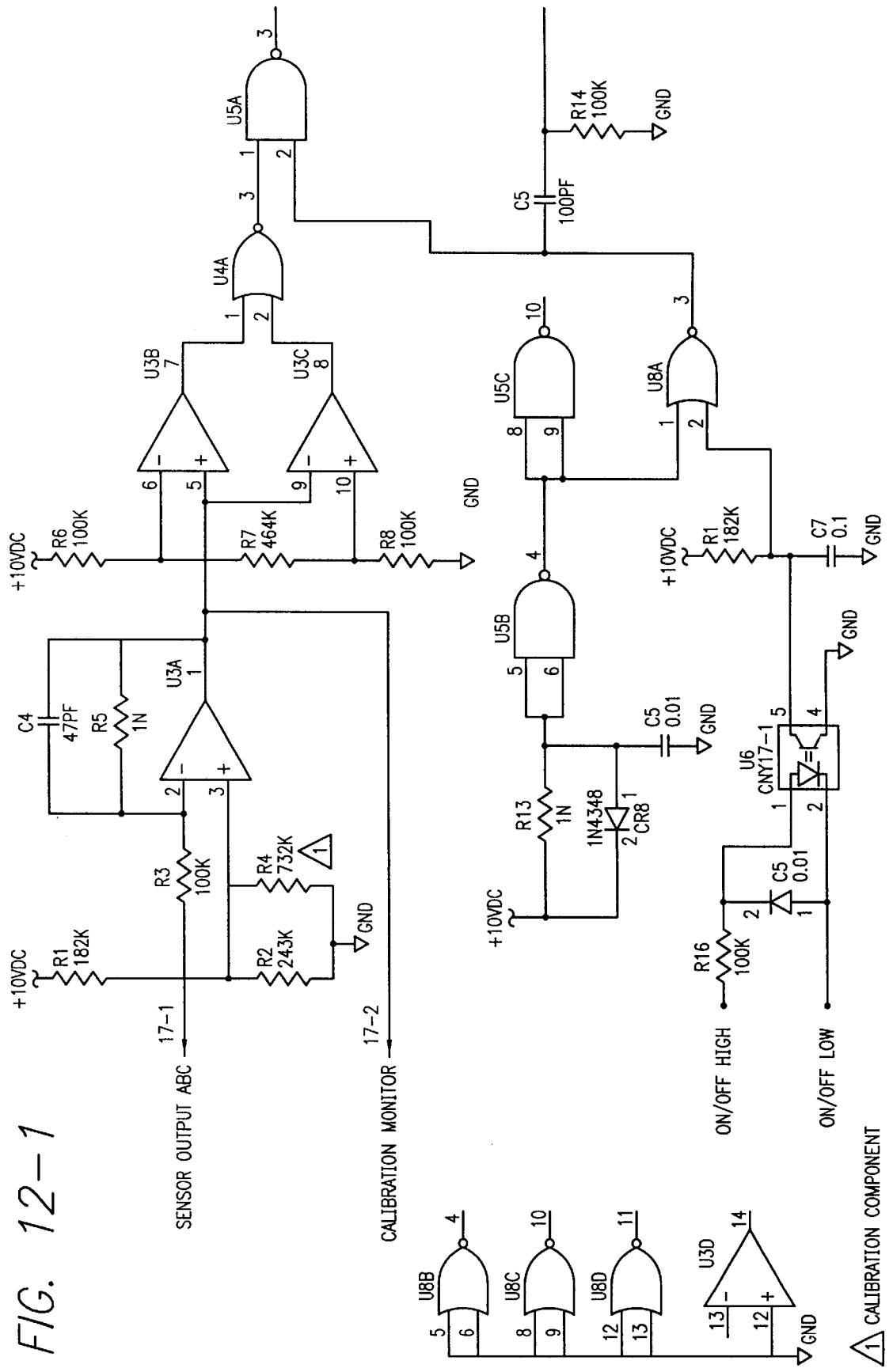
FIG. 12 illustrates a detailed view of the preferred logic controller portion of the control system shown in FIG. 9.
Figures 2, 12:
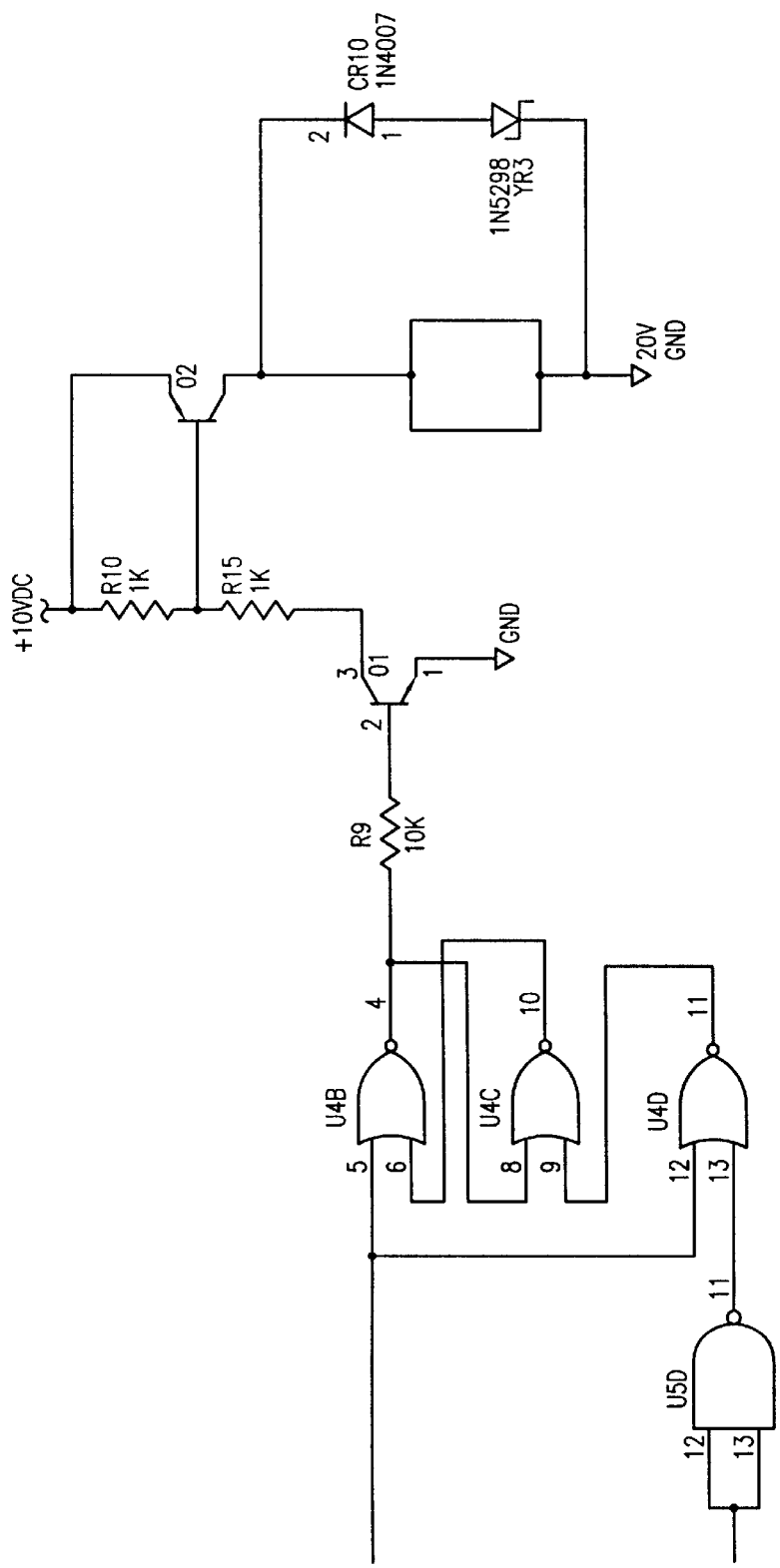
Figure 13:
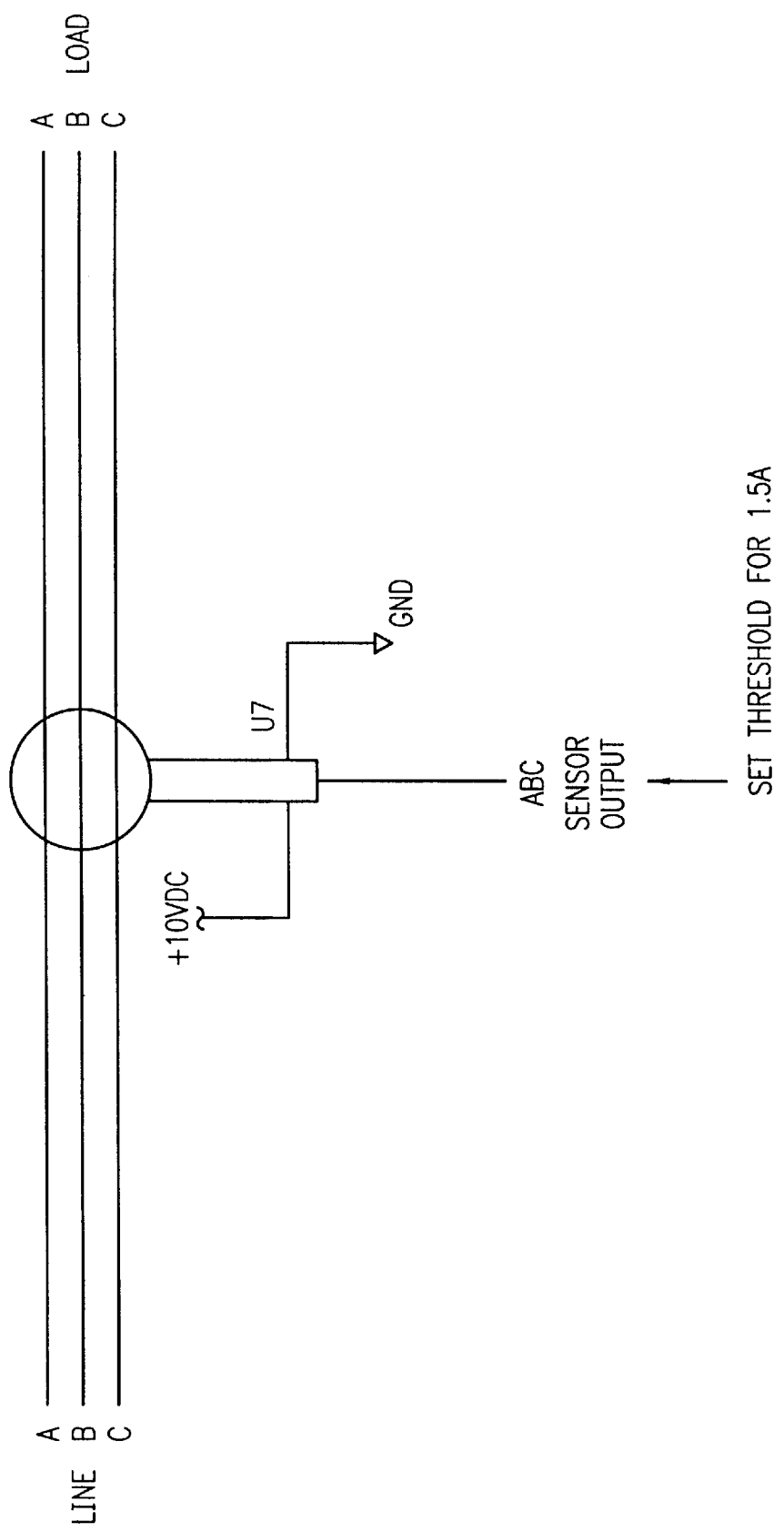
FIG. 13 illustrates a detailed view of a sensor for the control system of FIG. 9.

FIGS. 10 and 11 illustrate a detailed view of a preferred embodiment of the power supply. FIG. 12 illustrates a detailed view of a preferred embodiment of the logic controller. Referring to FIG. 13, showing a sensor for use in the control system of the invention, in a preferred embodiment of the present invention, the sensor preferably includes the IC U7, which is an Amploc Pro 5 Hall effect linear sensor with an output of 233 mV/A when operated at 10V. All three pump power-phase wires pass through the sensor core. Kirchhcoff's current law states that the net current in a node is 0. Considering the wye connection point of the pump winding and looking back to the inputs of the phase windings, the net current in the phase windings, when algebraically summed, is 0. If a ground fault exists, that is where the current is supplied through the sensor but does not return through the sensor, the algebraic sum of the currents in the phase wires would be equal to the ground fault current. For example, a fourth wire could be added to the wye connection point, and returned to the power source, but not pass through the sensor. The net current in all four wires would still be 0, but the imbalance current that passed through the sensor, by way of the three phase wires, would be equal to the current in the fourth wire.

In a preferred embodiment, the output of the sensor is approximately one-half of the supply voltage, for no measured imbalance. Amplifier U3A amplifies the signal by a factor of 10. The gain is set by the ratio of resistors R5 and R3. The 3 db point is where the reactance of capacitor C4 is equal to the resistance of R5. This occurs at 3386 Hz. Resistors R1, R2, and R4 bias the amplifier and have been selected so that a maximum value of 1 meg, for resistor R4, is required to adjust the amplifier output to mid supply with the sensor at its specified worse case high output. Calibration for the worse case low output of the sensor is easily achieved.

Amplifiers U3B and U3C, and resistors R6, R7, and R8 are set to detect a current imbalance greater than about 1.5A. A high output from amplifier U3B or U3C indicates an imbalance is present in excess of the 1.5A threshold. IC U4A "OR's" the outputs from amplifiers U3B and U3C. A logic 0 at its output indicates one or the other failure condition is present. Simultaneous imbalance inputs can be handled but are physically not possible since a positive imbalance cannot exist at the same time as a negative imbalance.

If a fault condition exists, it passes through IC U5A presenting a logic 1 to the latch comprised of ICs U4B and U4C. A logic 1, at pin 5, forces the output pin 4 low, turning transistor Q1 off, which removes the drive signal to the power control stage. Pin 9, the other input to the latch, is normally at logic 0. This will cause pin 10 to go high, setting the latch by presenting a logic 1 to pin 6.

In a preferred embodiment, the powerup sequence initializes the power control section to the non-operate mode. This is accomplished by presenting a logic 0 to pin 2 of IC U5A to mimic a current imbalance condition.

The powerup reset pulse created by IC U5B, resistor R13, capacitor C5 and diode CR8 is typically 7 msec. The reset is determined by the time it takes to charge capacitor C5 through resistor R13 to the threshold set by IC U5B. Diode CR8 provides a quick reset.

Diodes CR1, CR2, CR3, CR4, CR5, and CR6 form a full-wave three-phase bridge. Capacitor C1 acts as the storage device for the 281V peak voltage produced by the bridge. The regulators are a buck-type configuration with the abnormal architecture of having the inductor in the lower side. This is acceptable because the circuit does not have to be referenced to earth ground. In fact, the onboard electrical ground is approximately 270V and 260V above earth ground for the 10 V and 20V supplies respectively.

Preferably, the switcher operates in an non-conventional mode. If it is sensed that an output voltage is low, the corresponding controller turns on and remains on until the current through inductor L1 or L1A reaches a predetermined amount. Otherwise, the cycle is skipped. Energy is stored in inductor L1 or L1A and transferred to output capacitor C3 or C3A through diode CR7 or CR7A. Proper regulation is determined by Zener VR1 or VR1A and opto-coupler U2 or U2A. Capacitor C2 or C2A serves to store a small amount of energy that each respective regulator uses to operate its internal circuitry.

From the above, it may be seen that the present invention provides a method and apparatus for suppressing arcs in electrical equipment in aircraft which may be adapted to a variety of systems and components. As such, it provides more reliable and rapid disconnect of power than previous systems, thus reducing damage from ground faults in the circuits. While a particular form of the invention has been illustrated and described it will also be apparent that various modifications can be made without departing from the spirit and scope of the invention. Accordingly, it is not intended that the invention be limited except as by the appended claims.

What is claimed is:

1. A system for monitoring the current within an AC or DC electrical circuit and interrupting the electrical circuit during a ground fault, the electrical circuit having a line side and a load side with an electrical load connected thereto, the system comprising:

a power controller configured to complete the electrical circuit between the line side and the load side upon receipt of a drive signal generated externally or internally to the system;

a sensor configured to be continuously powered by the circuit being monitored, for sensing a current imbalance in the circuit and for providing a sensor signal indicating the existence of an undesirable current within the circuit based on said sensing of said current imbalance; and a logic controller configured to be powered by the circuit being monitored, to receive the sensor signal from the sensor, to compare the sensor signal with a predetermined range for acceptable operation for the electrical circuit, and to interrupt the drive signal to the power controller in the event that the sensor signal is not within said predetermined range, to thereby remove power to the load side.

2. The system of claim 1 wherein the load comprises an electrical motor.

3. A method for monitoring the current within an AC or DC electrical circuit and interrupting the electrical circuit during a ground fault, the electrical circuit having a line side connected to a power source and a load side connected to an electrical load, the method comprising:

using a sensor to monitor the circuit for a current imbalance in the circuit, said sensor being continuously powered from the circuit being monitored;

comparing the output of the sensor with a predetermined range of sensor outputs representing acceptable operation;

generating a signal representing a circuit fault if the sensor output is not within the range of sensor outputs representing acceptable operation; and removing power from the load side of the electrical circuit when said circuit fault signal is indicated.

4. A method for interrupting an AC or DC electrical circuit supplying power to an electrical load, the electrical circuit having a line side connected to a power source and a load side connected to the electrical load, the method comprising:

monitoring the circuit for current imbalance, using a current sensor that is continually powered by the circuit being monitored;

generating a signal representing said current imbalance;

comparing the signal representing said current imbalance to a range of signal levels representing acceptable operation; and interrupting the circuit when said signal from said sensor is not within the range of acceptable operation.

5. The method of claim 4 wherein interruption of the circuit when a current imbalance is sensed is maintained until the power source is cycled.

6. The method of claim 4 wherein the load comprises an electrical motor.

7. The method of claim 4 further comprising resetting the electrical circuit.

8. The method of claim 4 wherein the generating is performed by the current sensor and comparing is performed by a logic controller, the method further comprising providing power to the logic controller from the circuit being monitored.

9. An electrical circuit comprising:

a line side electrically connected to a load side through an AC or DC current path;

a power supply electrically connected to the current path and adapted to output electrical power of a predetermined voltage and current;

a power controller configure to complete the electrical circuit between the line side and the load side upon receipt of a drive signal generated from a location external or internal to the system to thereby feed power to the electrical load;

a sensor configured to continuously receive power from the power supply for sensing a current imbalance in the circuit and provide a sensor signal indicating the amount of current imbalance; and a logic controller configured to receive power from the power supply, to receive the sensor signal from the sensor, to compare the sensor signal with a range for sensor signal levels representing acceptable operation and to remove the drive signal to the power controller when the sensor signal is not within said range of acceptable operation.

10. The circuit of claim 9 wherein said removal of power to the load side suppresses arcing within a device being operated by the circuit.

11. The system of claim 1, further comprising a power supply electrically connected to the line side and adapted to output power to the sensor and the logic controller.

12. An apparatus for interrupting a current path between the line side and the load side of an AC or DC electrical circuit, said apparatus comprising:

a power supply electrically connected to the current path and adapted to output power;

a power controller configured to complete the current path between the line side and the load side upon receipt of a drive signal from an external or internal source to thereby feed power to the electrical load;

a sensor continuously powered by the power supply, adapted to monitor the current in the current path and to output a sensor signal indicative of the current balance in the current path; and a controller powered by the power supply, adapted to receive the sensor signal from the sensor system and to remove the drive signal to the power controller when the sensor signal does not fall within a predetermined range of sensor outputs representing acceptable operation.

13. The device of claim 12 wherein the current path comprises a plurality of electrical lines, the sensor senses among the electrical lines and the current balance comprises the current balance among the electrical lines.

* * * * *

UNITED STATES PATENT AND TRADEMARK OFFICE
CERTIFICATE OF CORRECTION

PATENT NO. : 6,583,975 B2
DATED : June 24, 2003
INVENTOR(S) : Raymond A. Bax

It is certified that error appears in the above-identified patent and that said Letters Patent is hereby corrected as shown below:

<u>Column 6,</u>
Line 27, change "from", to read -- by --.

Signed and Sealed this

Fourteenth Day of October, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,583,975 B2
DATED          : June 24, 2003
INVENTOR(S)    : Ronald A. Bax It is certified that error appears in the above-identified patent and that said Letters Patent is hereby corrected as shown below:

<u>Column 6,</u>
Line 27, change "from", to read -- by --.

This certificate supersedes Certificate of Correction issued October 14, 2003.

Signed and Sealed this

Sixth Day of April, 2004

JON W. DUDAS
*Acting Director of the United States Patent and Trademark Office*